US011606429B2

(12) United States Patent
Aharoni et al.

(10) Patent No.: US 11,606,429 B2
(45) Date of Patent: *Mar. 14, 2023

(54) DIRECT RESPONSE TO IO REQUEST IN STORAGE SYSTEM HAVING AN INTERMEDIARY TARGET APPARATUS

(71) Applicant: EMC IP Holding Company LLC, Hopkinton, MA (US)

(72) Inventors: Dan Aharoni, Brookline, MA (US); Itay Keller, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/070,073

(22) Filed: Oct. 14, 2020

(65) Prior Publication Data

US 2022/0116454 A1    Apr. 14, 2022

(51) Int. Cl.
*H04L 67/1097* (2022.01)
*G06F 3/06* (2006.01)
*G06F 13/20* (2006.01)

(52) U.S. Cl.
CPC .......... *H04L 67/1097* (2013.01); *G06F 3/061* (2013.01); *G06F 3/067* (2013.01);
(Continued)

(58) Field of Classification Search
CPC ... H04L 67/1097; G06F 3/061; G06F 3/0659; G06F 3/067; G06F 13/20; G06F 2213/16; G06F 2213/3808
See application file for complete search history.

(56) References Cited

U.S. PATENT DOCUMENTS 5,381,539 A    1/1995    Yanai et al.
5,551,003 A    8/1996    Mattson et al.
(Continued)

FOREIGN PATENT DOCUMENTS

WO  PCT/US2019/024885    1/2020
WO  PCT/US2019/024900    1/2020

OTHER PUBLICATIONS

Dell EMC, "Dell EMC VxRack FLEX," Dell EMC Product Overview, 2018, 5 pages.
(Continued)

*Primary Examiner* — Scott B Christensen
(74) *Attorney, Agent, or Firm* — Ryan, Mason & Lewis, LLP

(57) ABSTRACT

An apparatus comprises at least one processing device comprising a processor coupled to memory. The at least one processing device is configured to obtain an input-output request issued by an application executing on a compute node via at least one network and to identify a storage node as corresponding to the obtained input-output request based at least in part on the obtained input-output request. The at least one processing device is configured to associate information corresponding to the compute node with the input-output request and to submit the input-output request and the associated information that corresponds to the compute node to the storage node via the at least one network. The storage node is configured to submit a response to the input-output request to the compute node via the at least one network based at least in part on the information.

20 Claims, 7 Drawing Sheets

(52) U.S. Cl.
CPC ............ *G06F 3/0659* (2013.01); *G06F 13/20* (2013.01); *G06F 2213/16* (2013.01); *G06F 2213/3808* (2013.01)

(56) References Cited

U.S. PATENT DOCUMENTS

| | | | |
|---|---|---|---|
| 5,764,880 | A | 6/1998 | Gerdt et al. |
| 6,052,799 | A | 4/2000 | Li et al. |
| 6,941,420 | B2 | 9/2005 | Butterworth et al. |
| 8,843,676 | B2 | 9/2014 | Rajamanickam et al. |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 2002/0032835 | A1 | 3/2002 | Li et al. |
| 2003/0051036 | A1* | 3/2003 | Wang ................. H04L 67/2804 709/227 |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0244935 | A1 | 8/2014 | Ezra et al. |
| 2014/0344485 | A1* | 11/2014 | Dondini ................. G06F 13/28 710/22 |
| 2014/0380007 | A1* | 12/2014 | Suen ..................... G06F 3/0659 711/162 |
| 2016/0103764 | A1 | 4/2016 | Banerjee et al. |
| 2018/0113640 | A1 | 4/2018 | Fernandez et al. |
| 2018/0176124 | A1* | 6/2018 | Kancherla ............... H04L 45/38 |
| 2018/0241809 | A1* | 8/2018 | Gandhi ................... G06F 15/76 |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |
| 2020/0045080 | A1* | 2/2020 | Wisniewski ......... H04L 67/2842 |
| 2020/0403931 | A1* | 12/2020 | Agarwal .............. H04L 47/781 |
| 2021/0014302 | A1* | 1/2021 | Robison ................ H04L 67/101 |
| 2021/0382663 | A1* | 12/2021 | Lee ...................... H04L 61/2514 |

OTHER PUBLICATIONS

G. Soundararajan et al., "Dynamic Resource Allocation for Database Servers Running on Virtual Storage," Fast 2009: Proceedings of the 7th conference on File and storage technologies, Feb. 2009, pp. 71-84.
Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 13 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," HPCA, 10.1109/2006.1598129, pp. 200-211.
Wikipedia, "Raft (Computer Science)," https://en.wikipedia.org/wiki/Raft_(computer_science), Feb. 10, 2020, 4 pages.
Wikipedia, "Paxos (Computer Science)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
Dell Technologies, "Dell EMC PowerFlex: Secure Snapshots," Technical White Paper, Jul. 2020, 17 pages.
Dell Technologies, "Dell EMC PowerFlex: Protected Maintenance Mode," Technical White Paper, Jul. 2020, 20 pages.
Dell Technologies, "Dell EMC PowerFlex: Introduction to Replication," Technical White Paper, Jun. 2020, 34 pages.
Dell Technologies, "Dell EMC PowerFlex: Networking Best Practices and Design Considerations," Best Practices, Jun. 2020, 64 pages.
U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."
U.S. Appl. No. 16/807,709 filed in the name of Avi Puder et al. filed Mar. 3, 2020, and entitled "Management of Shared Resources in a Software-Defined Storage Environment."
U.S. Appl. No. 16/822,818 filed in the name of Itay Keller et al. filed Mar. 18, 2020, and entitled "Storage System Implementing Snapshot Longevity Ranking for Efficient Management of Snapshots."
U.S. Appl. No. 16/822,848 filed in the name of Itay Keller et al. filed Mar. 18, 2020, and entitled "Assignment of Longevity Ranking Values of Storage Volume Snapshots Based on Snapshot Policies."
U.S. Appl. No. 16/823,813 filed in the name of Itay Keller et al. filed Mar. 19, 2020, and entitled "Managing Incompressible Data in a Compression-Enabled Log-Structured Array Storage System."
U.S. Appl. No. 16/830,469 filed in the name of Roi Tagar et al. filed Mar. 26, 2020, and entitled "Storage Block Balancing Using Volume Part Migration."
U.S. Appl. No. 16/830,473 filed in the name of Yugal Peleg Lieblich et al. filed Mar. 26, 2020, and entitled "Replicated State Cluster with Standby Node State Assessment During Leadership Transition."
U.S. Appl. No. 16/830,946 filed in the name of Gil Ben Zeev et al. filed Mar. 26, 2020, and entitled "Storage Volume Migration Scheduling Based on Storage Volume Priorities and Specified Constraints."
U.S. Appl. No. 16/832,763 filed in the name of Michal Yarimi et al. filed Mar. 27, 2020, and entitled "Managing Storage Device Errors During Processing of Inflight Input/Output Requests."
U.S. Appl. No. 16/834,363 filed in the name of Itay Keller et al. filed Mar. 30, 2020, and entitled "Managing Least Recently Used Cache Using Reduced Memory Footprint Sequence Container."
U.S. Appl. No. 16/836,824 filed in the name of Itay Keller et al. filed Mar. 31, 2020, and entitled "Management of Volume Snapshots in a Data Storage System."
U.S. Appl. No. 16/888,742 filed in the name of Rivka Matosevich et al. filed May 31, 2020, and entitled "Balancing Resiliency and Performance by Selective Use of Degraded Writes and Spare Capacity in Storage Systems."
U.S. Appl. No. 16/918,654 filed in the name of Rivka Matosevich et al. filed Jul. 1, 2020, and entitled "Sharing Memory Resources Between Asynchronous Replication Workloads."
U.S. Appl. No. 16/983,423 filed in the name of Dan Aharoni et al. filed Aug. 3, 2020, and entitled "Deferred Reclamation of Invalidated Entries that are Associated with a Transaction Log in a Log-Structured Array."
U.S. Appl. No. 17/024,912 filed in the name of Anurag Sharma et al. filed Sep. 18, 2020, and entitled "Automatic Discovery and Configuration of Server Nodes."
U.S. Appl. No. 17/065,754 filed in the name of Dan Aharoni et al. filed Oct. 8, 2020, and entitled "Direct Response to IO Request in Storage System with Remote Replication."

\* cited by examiner

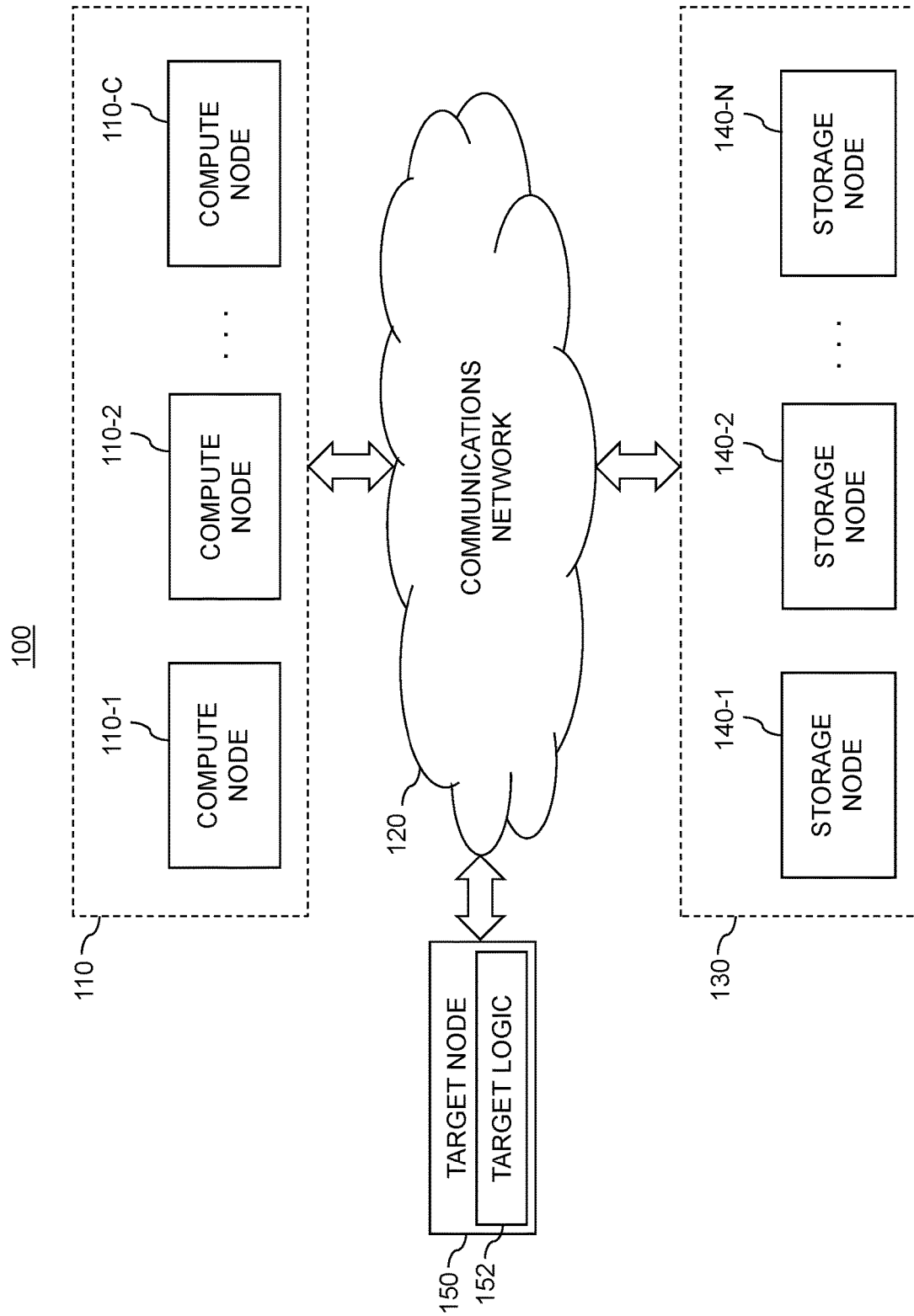

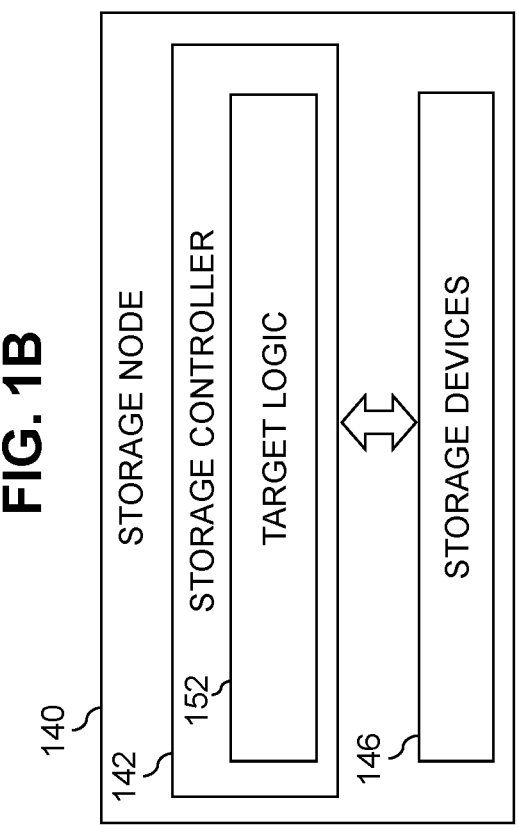

DIRECT RESPONSE TO IO REQUEST IN STORAGE SYSTEM HAVING AN INTERMEDIARY TARGET APPARATUS

FIELD

This disclosure relates generally to information processing systems, and more particularly to storage in information processing systems.

BACKGROUND

Information processing systems which host applications sometimes include non-volatile memory express over fabric (NVMeOF) functionality that is utilized for communication between compute nodes and storage nodes of the storage system. An NVMeOF driver may be installed on the compute nodes of the information processing system to provide functionality for interfacing with NVMeOF storage devices without the need for separate storage system specific driver components to be installed on the compute nodes. However, the use of such NVMeOF functionality is not without challenges. For example, in some cases, the use of such NVMeOF functionality may potentially increase both the latency associated with servicing input-output (IO) operations and the bandwidth usage of the storage system.

SUMMARY

In an illustrative embodiment, an apparatus comprises at least one processing device comprising a processor coupled to memory. The at least one processing device is configured to obtain an IO request issued by an application executing on a compute node via at least one network and to identify a storage node as corresponding to the obtained IO request based at least in part on the obtained IO request. The at least one processing device is configured to associate information corresponding to the compute node with the IO request and to submit the IO request and the associated information that corresponds to the compute node to the storage node via the at least one network. The storage node is configured to submit a response to the IO request to the compute node via the at least one network based at least in part on the information.

Other embodiments of the disclosure include, without limitation, server nodes, and articles of manufacture comprising processor-readable storage media for managing incompressible data in a compression-enabled log-structured array storage system.

BRIEF DESCRIPTION OF THE DRAWINGS

FIGS. 1A and 1B schematically illustrate an information processing system comprising a storage system according to an embodiment of the disclosure.

DETAILED DESCRIPTION

Figure 2:
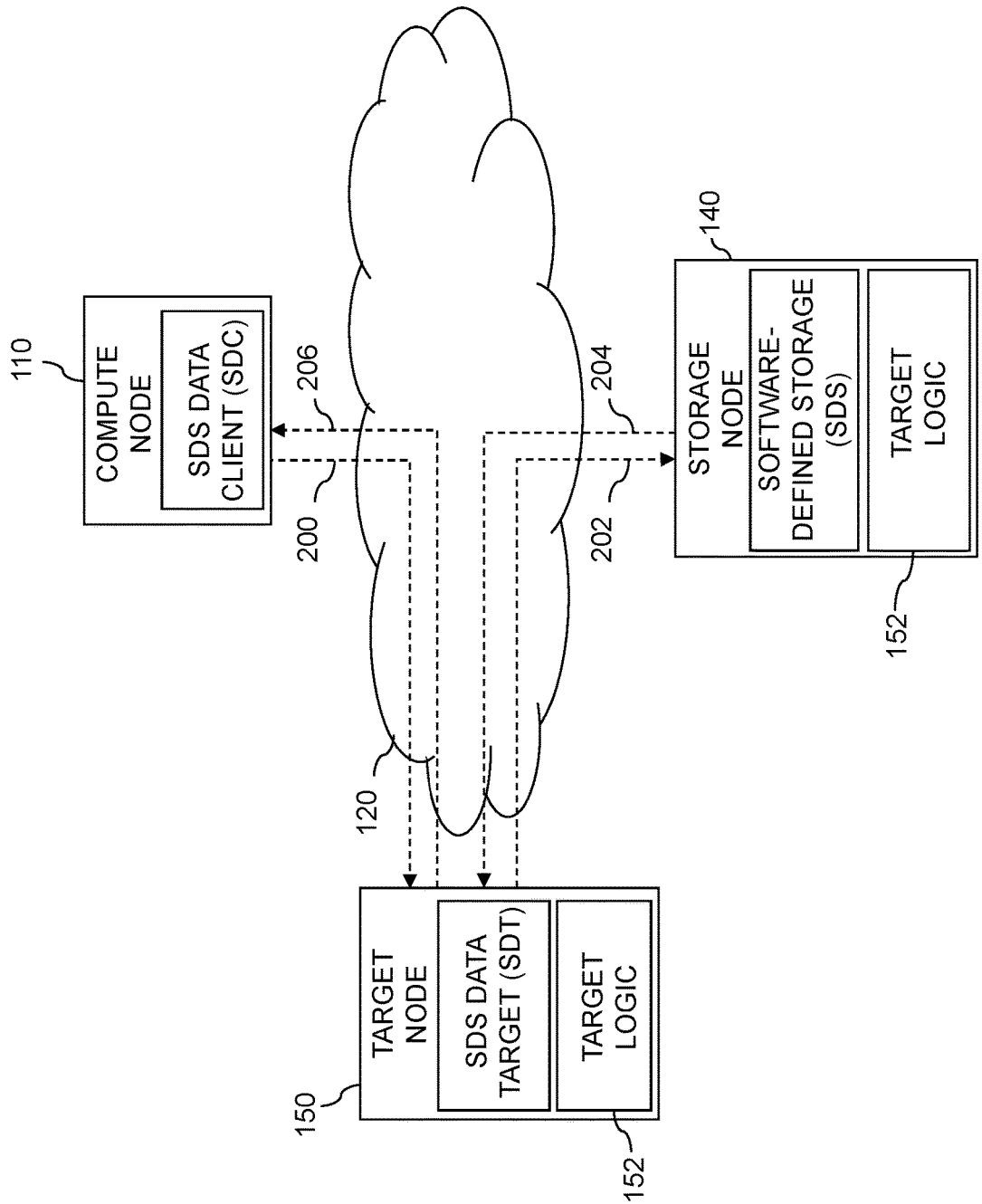
FIG. 2 schematically illustrates an example information processing system that implements target functionality according to an embodiment of the disclosure.

Exemplary embodiments will be described herein with reference to exemplary information processing systems which implement compression-enabled storage systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

FIGS. 1A and 1B schematically illustrate an information processing system comprising a storage system according to an exemplary embodiment of the disclosure. More specifically, FIG. 1A schematically illustrates an information processing system 100 which comprises a plurality of compute nodes 110-1, 110-2, . . . , 110-C (collectively referred to as compute nodes 110, or each singularly referred to as a compute node 110), a communications network 120, a data storage system 130 and a target node 150. The data storage system 130 comprises a plurality of storage nodes 140-1, 140-2, . . . , 140-N (collectively referred to as storage nodes 140, or each singularly referred to as a storage node 140). In the context of some exemplary embodiments described herein, the data storage system 130 supports target functionality such as, e.g., NVMEoF functionality, and storage media that is accessed and controlled by the storage nodes 140. FIG. 1B schematically illustrates an exemplary framework of at least one or more of the storage nodes 140.

In particular, as shown in FIG. 1B, the storage node 140 comprises a storage controller 142 and a plurality of storage devices 146. In general, the storage controller 142 implements data storage and management methods that are configured to divide the storage capacity of the storage devices 146 into storage pools and logical volumes. Storage controller 142 is further configured to implement target logic 152 in accordance with the disclosed embodiments, as will be described in further detail below. It is to be noted that the storage controller 142 may include additional modules and other components typically found in conventional implementations of storage controllers and storage systems, although such additional modules and other components are omitted for clarity and simplicity of illustration.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue input-output (IO) requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly constructed and not viewed as being limited to storage systems of any particular type or types. In some embodiments, the storage nodes 140 comprise storage server nodes having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 146 comprise DAS resources (internal and/or external storage resources) such as hard-disk drives (HDDs), solid-state drives (SSDs), Flash memory cards, or other types of non-volatile memory (NVM) devices such as non-volatile random access memory (NVRAM), phase-change RAM (PC-RAM) and magnetic RAM (MRAM). These and various combinations of multiple different types of storage devices 146 may be implemented in the storage node 140. In this regard, the term "storage device" as used herein is intended to be broadly construed, so as to encompass, for example, SSDs, HDDs, flash drives, hybrid drives or other types of storage media. The data storage devices 146 are connected to the storage node 140 through any suitable host interface, e.g., a host bus adapter, using suitable protocols such as ATA, SATA, eSATA, NVMe, SCSI, SAS, NVMeOF, etc. In other embodiments, the storage node 140 can be network connected to one or more NAS nodes over a local area network.

The storage controller 142 is configured to manage the storage devices 146 and control 10 access to the storage devices 146 and/or other storage resources (e.g., DAS or NAS resources) that are directly attached or network-connected to the storage node 140. In some embodiments, the storage controller 142 is a component (e.g., storage data server) of a software-defined storage (SDS) system which supports the virtualization of the storage devices 146 by separating the control and management software from the hardware architecture. More specifically, in a software-defined storage environment, the storage controller 142 comprises an SDS storage data server that is configured to abstract storage access services from the underlying storage hardware to thereby control and manage IO requests issued by the compute nodes 110, as well as to support networking and connectivity. In this instance, the storage controller 142 comprises a software layer that is hosted by the storage node 140 and deployed in the data path between the compute nodes 110 and the storage devices 146 of the storage node 140, and is configured to respond to data IO requests from the compute nodes 110 by accessing the storage devices 146 to store/retrieve data to/from the storage devices 146 based on the IO requests.

In a software-defined storage environment, the storage controller 142 is configured to provision, orchestrate and manage the local storage resources (e.g., the storage devices 146) of the storage node 140. For example, the storage controller 142 implements methods that are configured to create and manage storage pools (e.g., virtual pools of block storage) by aggregating capacity from the storage devices 146. The storage controller 142 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device only includes either HDD devices or SSD devices, etc.).

In the software-defined storage environment, each of the storage nodes 140 in FIG. 1A can run an instance of the storage controller 142 to convert the respective local storage resources (e.g., DAS storage devices and/or NAS storage devices) of the storage nodes 140 into local block storage. Each instance of the storage controller 142 contributes some or all of its local block storage (HDDs, SSDs, PCIe, NVMe, NVMeOF and flash cards) to an aggregated pool of storage of a storage server node cluster (e.g., cluster of storage nodes 140) to implement a server-based storage area network (SAN) (e.g., virtual SAN). In this configuration, each storage server node 140 is part of a loosely coupled server cluster which enables "scale-out" of the software-defined storage environment, wherein each instance of the storage controller 142 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage controllers 142 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A.

On the client-side, compute nodes 110 may implement SDS data clients (SDCs) which are lightweight block device drivers that may be deployed on each server node that consumes the shared block storage volumes exposed by the storage controllers 142. In particular, the SDCs run on the same servers as the compute nodes 110 which require access to the block devices that are exposed and managed by the storage controllers 142 of the storage nodes 140. The SDC exposes block devices representing the virtual storage volumes that are currently mapped to that host. In particular, the SDC serves as a block driver for a client (server), wherein the SDC intercepts IO requests, and utilizes the intercepted IO request to access the block storage that is managed by the storage controllers 142. The SDC provides the operating system or hypervisor (which runs the SDC) access to the logical block devices (e.g., volumes).

The SDCs have knowledge of which SDS control systems (e.g., storage controller 142) hold its block data, so multipathing can be accomplished natively through the SDCs. In particular, each SDC knows how to direct an IO request to the relevant destination SDS storage data server (e.g., storage controller 142). In this regard, there is no central point of routing, and each SDC performs is own routing independent from any other SDC. This implementation prevents unnecessary network traffic and redundant SDS resource usage. Each SDC maintains peer-to-peer connections to every SDS storage controller 142 that manages the storage pool. A given SDC can communicate over multiple pathways to all of the storage nodes 140 which store data that is associated with a given IO request. This multi-point peer-to-peer fashion allows the SDS to read and write data to and from all points simultaneously, eliminating bottlenecks and quickly routing around failed paths.

The SDS metadata manager components are deployed on multiple server nodes and operate in a manner which forms a tightly coupled cluster that is configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that is required for system operation of the SDS environment such as configuration changes, managing the SDS data clients and data servers, device mapping, values, snapshots, system capacity including device allocations and/or release of capacity, RAID protection, errors and failures, and system rebuild tasks including rebalancing.

Regardless of the specific implementation of the storage environment, as noted above, the storage controller 142 of FIG. 1B provides data storage and management methods that are configured to implement any suitable logical volume management (LVM) system which is configured, e.g., to create and manage local storage volumes by aggregating the storage devices 146 into one or more virtual storage pools that are thin-provisioned for maximum capacity, and logically divide each storage pool into one or more storage volumes that are exposed as block devices (e.g., raw logical unit numbers (LUNs)) to the compute nodes 110 to store data.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and storage controllers 142 implement methods to support various data storage management services such as data protection, data migration, data deduplication, replication, thin provisioning, snapshots, data backups, etc.

In some cases, the NVMeOF communication protocol may be utilized by the compute nodes 110 and data storage system 130. The NVMeOF communication protocol provides a common standard that allows the application servers, e.g., compute nodes 110, to access the storage nodes 140 of the data storage system 130 without the need to install any special storage agent on the compute nodes 110 such as, e.g., the SDC described above. For example, under many communication protocol implementations, an SDC or other software driver needs to be installed on the compute node 110 that hosts an application to provide the functionality to interface with the storage nodes 140. NVMeOF implementations, on the other hand, typically do not require that a separate SDC be installed to communicate with the storage nodes 140.

However, in order to allow the compute node 110 to access the storage nodes 140 an intermediary target functionality may be needed to act as the target of application commands issued by the compute nodes 110 under the NVMeOF protocol or other protocols that do not require a separate SDC to be installed on the compute devices 110 to communicate with the storage nodes 140. For example, in illustrative embodiments, a new entity, referred to herein as an SDS data target (SDT) that functions as the target of the NVMeOF command may be utilized. As an example, the SDT may be implemented on a target node 150 of the information processing system 100.

In some embodiments, the target node 150 comprises one or more processing devices each having a processor and a memory and may comprise other functionality to that described above for compute nodes 110 or storage nodes 140. For example, target node 150 may comprise additional or alternative functionality for processing incoming IO requests from an application executing on a compute node 110 to translate the IO requests for use by the storage nodes 140. In some embodiments, one or more of storage nodes 140 may comprise at least a portion of the functionality of the target node 150. In some embodiments, one or more of compute nodes 110 may comprise at least a portion of the functionality of the target node 150. In some embodiments, at least a portion of the functionality of the target node 150 may be implemented separately from compute nodes 110 and storage nodes 140, for example, on another node.

While NVMeOF reduces the need of the compute node 110 to install additional software drivers or SDCs, the SDT is instead introduced into the information processing system 100 as the target of IO requests issued by the applications executing on the compute node 110, which adds overhead to the general workload of the information processing system 100. For example, IO requests issued by the application of the compute node 110 for the NVMeOF communication protocol have to pass through the SDT of the target node 150 before being provided to the SDSs of the storage nodes 140 because the compute node 110 has no visibility into the storage layout of the storage nodes 140 due to the lack of an installed driver or SDC. The use of the SDT generally adds an additional network hop in each direction to the IO operations which in some cases may approximately double the response time and cause the available network bandwidth to be approximately half of what it would be if the SDT was not being used when the network bandwidth is the limit.

The SDT is a lightweight block device driver that is deployed on the target node 150 and is configured to act as a target for IO requests issued by the application of the compute node 110 for the NVMeOF communication protocol. In particular, the SDT acts as an intermediary between the compute node 110 and the SDSs to handle routing of the IO operations submitted by the compute nodes 110 to the storage nodes 140.

The introduction of the SDT into the flow of IO requests between the compute nodes 110 and storage nodes 140 may often add overhead to the application workload. With reference to FIG. 2, for example, during read IO requests, the IO requests from the application are first sent by the compute node 110 along a communication pathway 200 to the SDT of the target node 150 via the network 120 where the SDT acts as a target for the IO requests. The SDT performs any necessary processing on the IO requests and provides the IO requests to the SDS of the storage node 140 along a communication pathway 202. This process generally adds an additional network hop to any read IO requests being submitted to the storage nodes 140, which effectively doubles the read response time and may cause the available network bandwidth being allocated for use by IO requests of the compute node 110 reduced, e.g., to approximately half of the available network bandwidth limit that would be available for use in communications between the compute node 110 and the storage node 140 absent the need for utilizing the SDT of the target node 150.

When a response to a read IO request is to be returned to a compute node 110, the SDS of the storage node 140 provides the response and accompanying data back to the SDT of the target node 150 along a communication pathway 204. The SDT then provides the response and data back to the compute node 110 along a pathway 206. This response process also requires an additional hop and bandwidth usage which may further impinge the read response time and network bandwidth. This is especially the case since the data associated with the IO request is being sent not only to the compute node 110 but also to the intermediary target node 150.

When an end user of the compute nodes 110 adds NVMeOF functionality, e.g., through the use of target nodes 150, they often expect the NVMeOF functionality to have a minimal impact on the throughput of the storage system as compared to a workload using other communication protocols. As mentioned above, however, since the use of NVMeOF does not require a driver or other additional software to be installed on the compute node 110 and instead utilizes the SDT of the target node 150 as the target for IO requests, a significant impact on the read response time and network bandwidth usage may be observed due the need for an additional hop in each direction between the compute nodes 110, target node 150 and storage nodes 140 as compared to a system that submits the IO requests from the compute nodes 110 to the storage nodes 140 without a target node 150 intermediary. This may especially be the case where the bandwidth usage is close to a limit of available bandwidth for use by the compute nodes 110.

Figure 3:
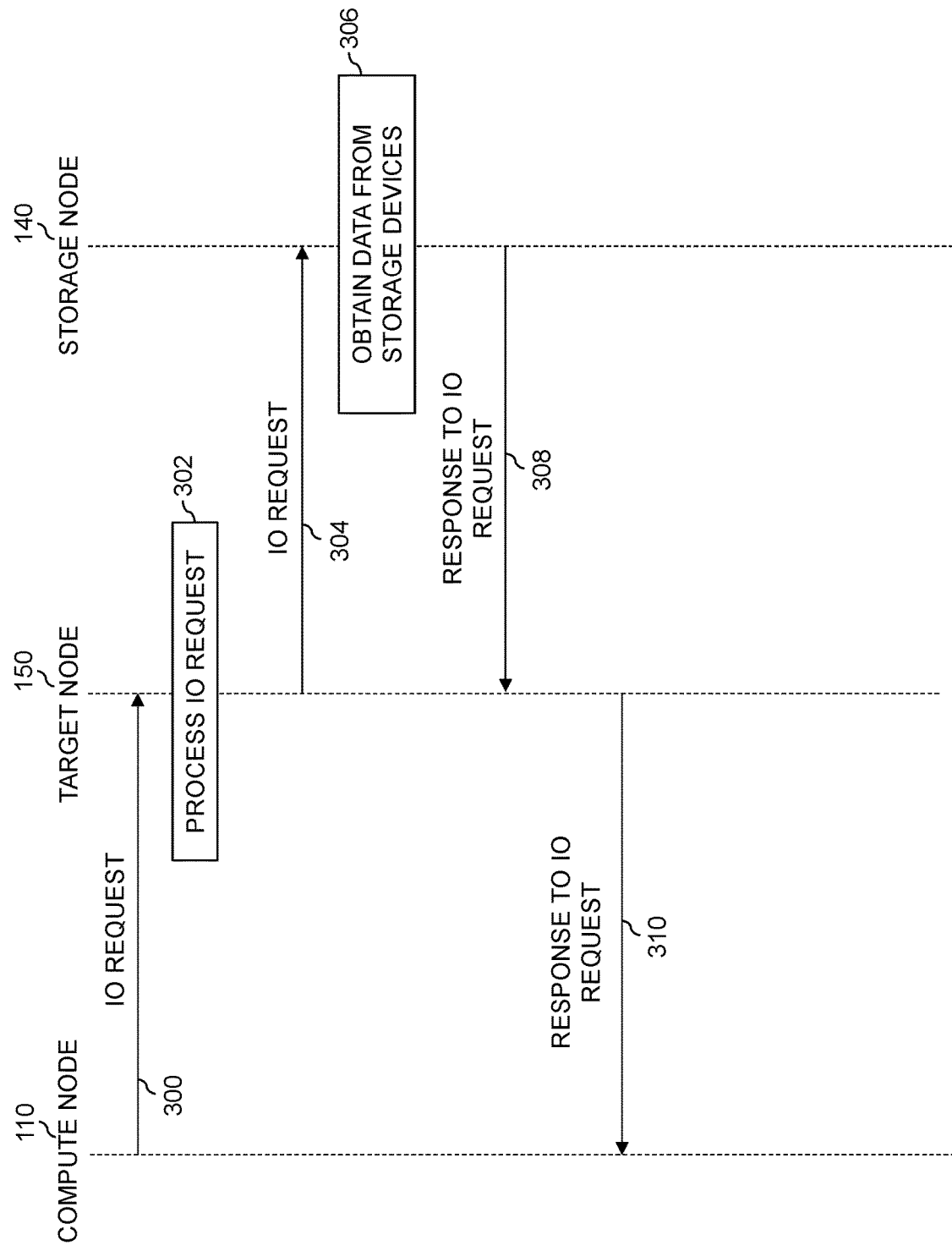
FIG. 3 is a sequence diagram illustrating a sequence for responding to an IO request according to the embodiment of FIG. 2.

With reference to FIG. 3, for example, when an application executing on a compute node 110 issues an IO request under the NVMeOF protocol such as, e.g., a read request, the IO request is first submitted to the target node 150 which acts as a target for the IO request at step 300.

At step 302, the SDT of the target node 150 processes the IO request, for example, to identify which storage node(s) 140 are associated with the IO request. For example, the SDT may function in a similar manner to the SDC as described above in determining the routing of the IO request to the storage nodes 140.

At step 304, the SDT of the target node 150 forwards the IO request to the identified storage node 140 for processing.

At step 306, the SDS of the storage node 140 processes the IO request and obtains the corresponding data from the storage devices 146.

At step 308, the SDS of the storage node 140 provides a response to the IO request to the SDT of the target node 150. In some embodiments, the response may also comprise the data associated with the IO request.

At step 310, the SDT forwards the response to the compute node 110 and the compute node 110 processes the response and provides the data to the application.

As can be seen in the sequence diagram of FIG. 3, when NVMeOF is implemented in the information processing system, IO requests issued by the applications executing on the compute nodes 110 are submitted to the target node 150 which acts as a target for the IO requests. The SDT of the target node 150 then delivers the IO request to the corresponding storage nodes 140 for processing.

The IO request travels two hops to reach the storage node 150 from the compute node 110, one between the compute node 110 and the target node 150, and one between the target node 150 and the storage node 140. In addition, the response travels two more hops to reach the compute node 110 from the storage node 140, one between the storage node 140 and the target node 150, and one between the target node 150 and the compute node 110.

For large IO requests, where the available network bandwidth is being utilized as much as possible to submit the response and data, the extra return hops will cause the maximum available bandwidth on the network 120 to be approximately halved as compared to a case where compute node 110 communicates directly with storage node 140, e.g., under a different protocol using the SDC.

Figure 4:
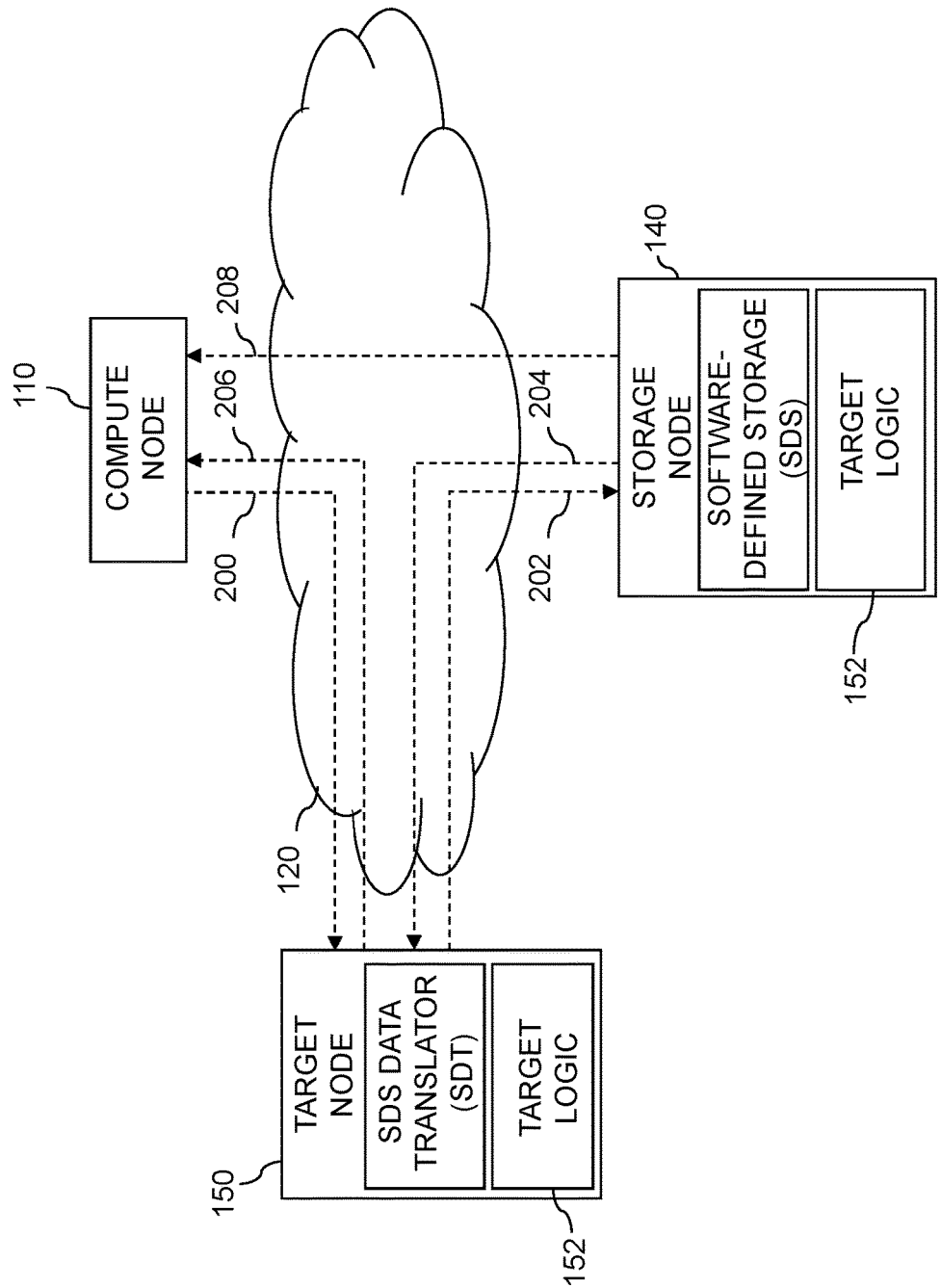
FIG. 4 schematically illustrates an example information processing system that implements target functionality according to another embodiment of the disclosure.

With reference now to FIG. 4, in illustrative embodiments, target logic 152 may be implemented by target node 150, storage node 140, or in part by target node 150 and in part by storage node 140. Target logic 152 is configured to at least partially alleviate the burden on the available bandwidth of the network 120 associated with the use of the NVMeOF communication protocol by providing separate communication paths for the IO request and the response to the IO request. As seen in FIG. 4, for example, an additional communication path 208 between storage node 140 and compute node 110 may be utilized by target logic 152 in addition to communication paths 200, 202, 204 and 206.

As an example, when the compute node 110 submits an IO request to the storage system, the IO request is first obtained by the SDT of the target node 150 via communication pathway 200 and is processed by the SDT to determine the corresponding storage node 140 as described above. The SDT of the target node 150 submits the IO request to the SDS of the storage node 140, e.g., via communication pathway 202.

In this case, when the data is retrieved and a response to the IO request is generated by the SDS of the storage node 140, the target logic 152 utilizes the SDS to submit the response and corresponding data to the compute node 110 via communication pathway 208 instead of returning the response and data back to the SDT of the target node 150 via communication pathway 206. In this manner, the additional network hop to the target node 150 for the response and corresponding data may be avoided.

In some embodiments, the target logic 152 may submit information associated with the corresponding compute node 110 from which it received the IO request to the storage node 140. As an example, the information may comprise routing information, an IP address, port information, or any other information that may be utilized by the storage node 140 to submit a response and data corresponding to the IO request to the compute node 110 via communication pathway 208 instead providing the response and corresponding data back to the SDT of the target node 150 as a response to the IO request received by the SDS of the storage node 140 from the SDT of the target node 150.

Figure 5:
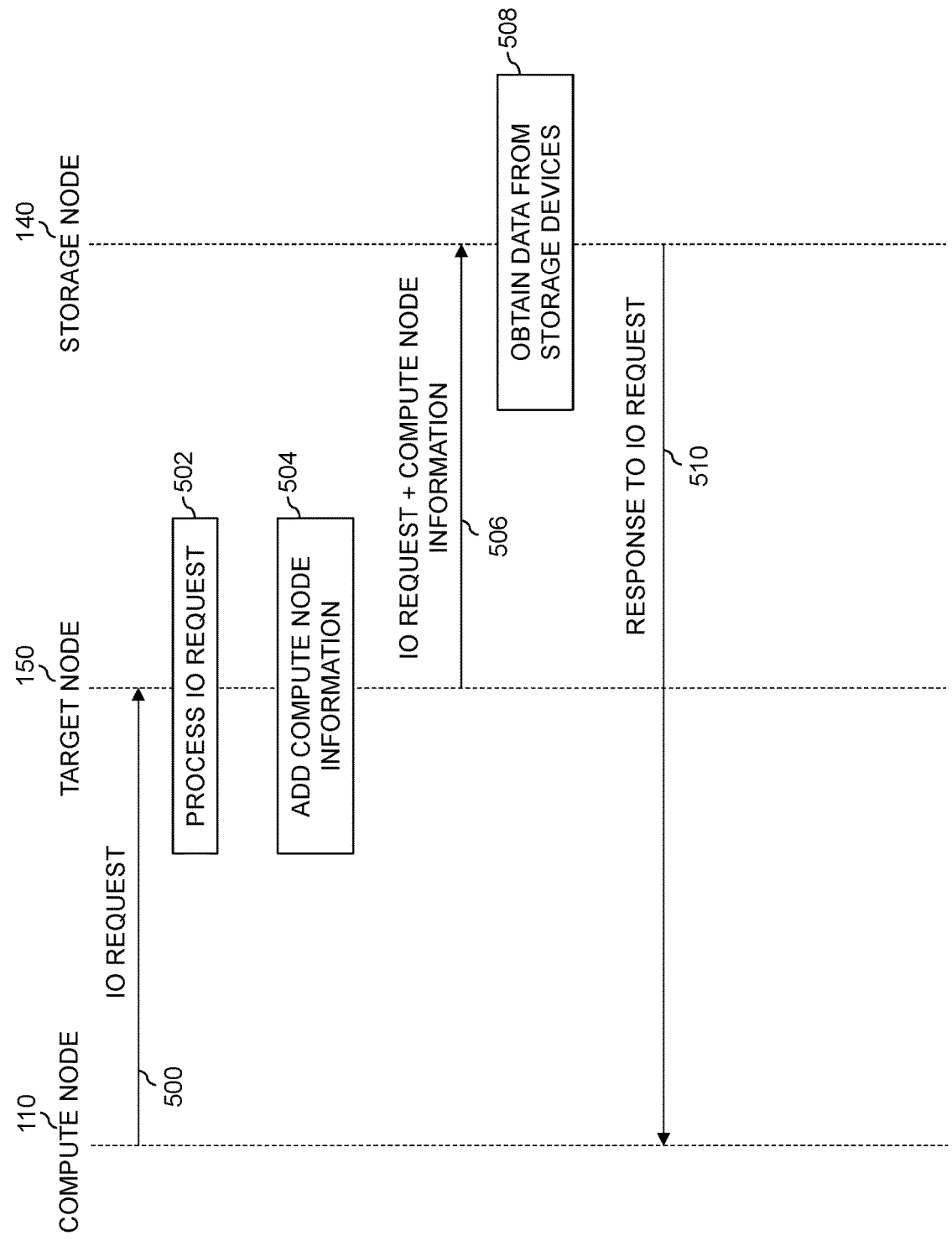
FIG. 5 is a sequence diagram illustrating a sequence for responding to an IO request according to the embodiment of FIG. 4.

With reference to FIG. 5, for example, when an IO request of an application such as, e.g., a read request, is selected for submission to the storage nodes 140 by a compute node 110, the IO request is first submitted to the target node 150 which acts as a target for the IO request at step 500.

At step 502, the SDT of the target node 150 processes the IO request, for example, to identify which storage node(s) 140 are associated with the IO request. For example, the SDT may function in a similar manner to the SDC as described above in determining the routing of the IO request to the storage nodes 140.

At step 504, the SDT of the target node 150 associates the information about the compute node 110 from which the IO request was obtained with the IO request. In some embodiments, for example, the information may be added or appended to the IO request. In some embodiments a message may be generated that comprises the IO request and the information about the compute node 110.

At step 506, the SDT of the target node 150 submits the IO request and the associated information about the compute node 110 to the storage node 140 for processing. As mentioned above, the information about the compute node 110 may be appended to the IO request itself, may be submitted to the storage node 140 in the same message as the IO request but separate from the IO request, may be submitted to the storage node 140 as a separate message that indicates the association of the IO request with information of the corresponding compute node 110 or may be otherwise made available to the storage node 140 in any other manner.

At step 508, the SDS of the storage node 140 processes the IO request and obtains the corresponding data from the storage devices 146.

At step 510, the SDS of the storage node 140 provides a response to the IO request to the compute node 110, e.g., via communication pathway 208 (FIG. 4). For example, target logic 152 may cause the SDS to provide the response to the compute node 110 via the communication pathway 208 based at least in part on the information obtained from the target node 150 in conjunction with receipt of the IO request. In some embodiments, the response may also comprise data associated with the IO request.

As can be seen in the sequence diagram of FIG. 5, when the disclosed target logic 152 is implemented, the response to the IO request and the corresponding data are provided to the corresponding compute node 110 by a single hop from the storage node 140 to the compute node 110, instead of the two hops that would normally be needed to provide the response and corresponding data to the compute node 110 via the target node 150. For large IO requests, where the available network bandwidth is being utilized as much as possible to submit the response and data, the reduction in the number of hops will cause the maximum available bandwidth on the network 120 to be improved. For example, where the two hops mentioned above resulted in an approximate halving of the available network bandwidth, e.g., half of the bandwidth for each hop, the reduction in the number of hops, e.g., from two to one, may result in a significant increase in the available bandwidth of the network for use in processing IO requests and their responses from the storage nodes 140 and may also result in a reduction in the latency of processing IO requests. For example, in some cases the latency may be reduced by, e.g., approximately 25% or any other amount depending on the IO load on the system and the size, while the network overhead may be reduced by, e.g., approximately 50% or any other amount. For example, by utilizing the disclosed target logic 152, the response time and bandwidth in a storage system utilizing NVMeOF for a read IO request will be very close to the response time for a communication protocol that utilizes another communication protocol or an SDC to communicate directly with the storage nodes 140, e.g., in a case where the extra network time for the forwarding the request between the compute nodes 110 and the SDS via the SDT is small and the SDT CPU overhead is also small.

In some embodiments, in conjunction with providing the information about the compute node 110 to the storage node 140, the target logic 152 may also provide or otherwise make available to the compute node 110 an indication that this information has been provided to the SDS storage node 140. This indication may be utilized by the compute node 110 to prepare to receive the response and corresponding data from the storage node 140 without using the target node 150 as an intermediary.

In some embodiments, the SDS of the storage node 140 may notify the SDT of the target node 150 that the response to the IO request has been sent to the compute node 110 via the communication pathway 208. For example, this notification may be performed in conjunction with the transmission of the response and data to the compute node 110 and by its nature may require a very small amount of overhead.

In some embodiments, the SDS of the storage node 140 may provide the response to the IO request to the SDT of the target node 150 for forwarding to the compute node 110 while separately submitting the data corresponding to the IO request to the compute node 110 over the communication pathway 208 based at least in part on the information about the compute node 110.

In some cases, the application executing on the compute node 110 may not recognize the SDS that will be sending the data associated with the IO request back to the compute node 110. For example, the application of the compute node 110 may be expecting the response from the SDT, not the SDS. In one example, the TCP communication protocol may be utilized for the initial communication with the SDT of the target node 150 which may create a communication session between the compute node 110 and the SDT of the target node 150. The application of the compute node 110 may then expect the response to the IO request to be returned as part of that communication session.

In an embodiment, the SDS of the storage node 140 may provide the data and response to the compute node 110 in a manner that appears to the compute node 110 to be from the SDT of the target node 150. For example, in some cases, the SDS may spoof the identity of the SDT and pretend to be the SDT. For example, the SDT may provide the SDS with information about itself that allows the SDS to spoof the identity of the SDT when providing the response to the compute node 110. As an example, the compute node 110 may be configured to open a particular socket on which it expects to receive the response and data from the SDT. In this case, the SDT may provide the socket information to the SDS which may then provide the response and data to the compute node 110 on that socket as if it were the SDT.

In another embodiment, the NVMeOF driver on the compute node 110 may be modified or otherwise enhanced to comprise a listening feature that provides a location for the SDS to submit the response and data. For example, the NVMeOF standard driver may be modified with an understanding that the response to an IO request may not be returned on the socket associated with that IO request that was identified to the SDT as the target for the response. In this case, for example, the NVMeOF standard driver may be modified to specify a specific port, socket or other entry point of the compute node 110 as a separate socket that is utilized as a target location for listening for responses to IO requests that are submitted separately from the communication session between the compute node 110 and the SDT, e.g., by the SDS of the storage node 140.

While described herein with reference to NVMeOF implementations, the disclosed techniques may be utilized with any other communication or storage protocol that utilizes an intermediary target node 150.

The particular processing operations and other system functionality described above in conjunction with the sequence diagram of FIG. 5 are presented by way of illustrative examples only, and should not be construed as limiting the scope of the disclosure in any way. Alternative embodiments can use other types of processing operations for implementing target functionality as described herein.

Functionality such as that described in conjunction with the sequence diagram of FIG. 5 can be implemented at least in part in the form of one or more software programs stored in memory and executed by a processor of a processing device such as a computer or server.

Figure 6:
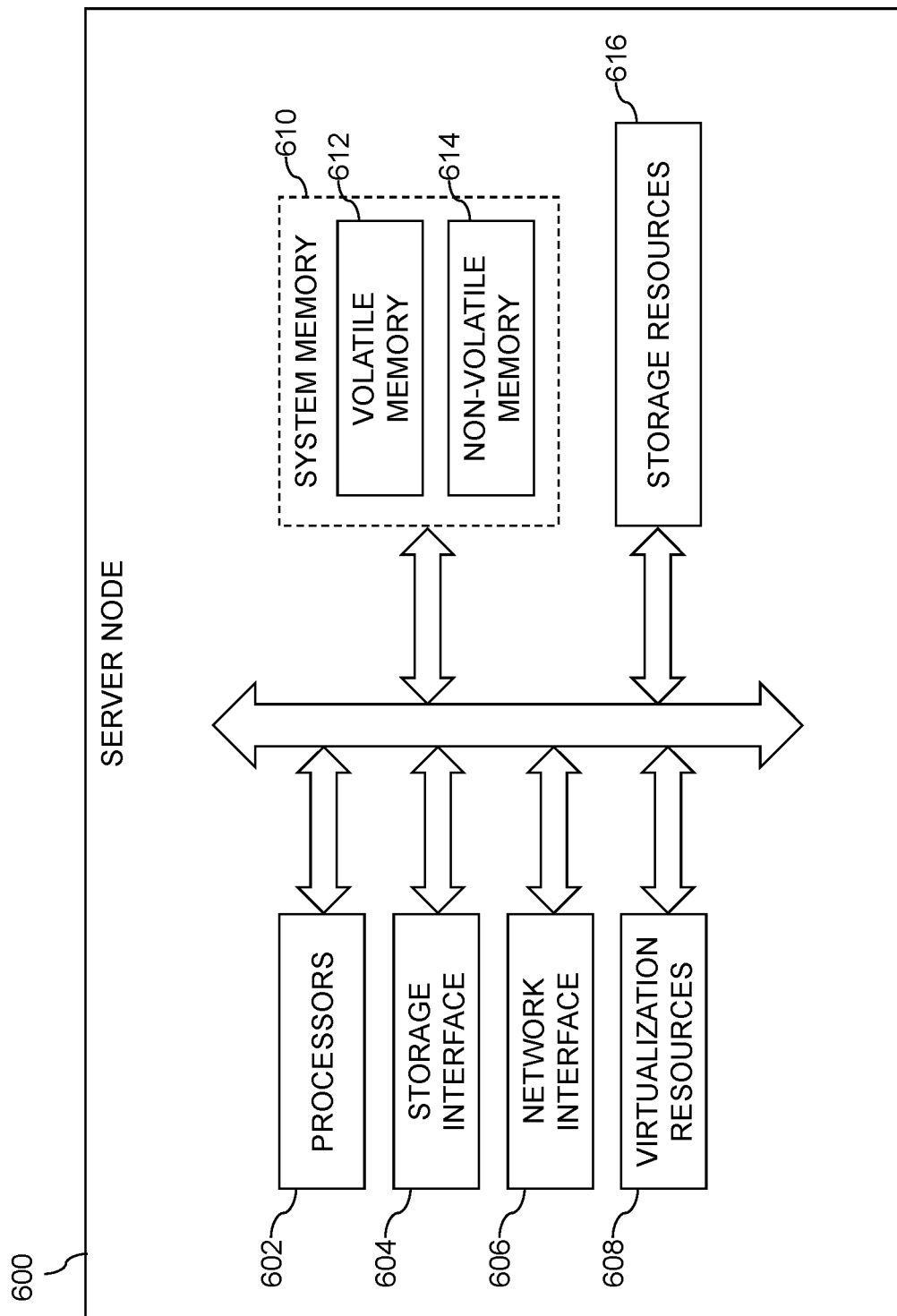
FIG. 6 schematically illustrates a framework of a server node for implementing target functionality according to an exemplary embodiment of the disclosure.

FIG. 6 schematically illustrates a framework of a server node (e.g., the storage node(s) 140 or the target node 150, FIGS. 1A and 1B) which can be implemented for hosting a storage control system (e.g., the storage controller 142, FIG. 1B), according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614.

The processors 602 comprise one or more types of hardware processors that are configured to process program instructions and data to execute a native operating system (OS) and applications that run on the server node 600. For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, non-volatile memory express (NVMe), NVMe over fabric (NVMeOF), peripheral component interconnect express (PCIe), Parallel ATA (PATA), Serial ATA (SATA), Serial Attached SCSI (SAS), Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, IO adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities of the storage controller 142 or target logic 152 as shown in FIG. 1B as discussed herein. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well as execute one or more of the various modules and functionalities of the storage controller 142 or target logic 152 of FIG. 1B as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various components, systems, and modules of the storage controller 142 or target logic 152 comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile system memory 612 is configured as the highest-level memory tier, and the non-volatile system memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with 10 reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:
   at least one processing device comprising a processor coupled to memory, the at least one processing device being configured:
   to obtain an input-output request issued by an application executing on a compute node via at least one network;
   to identify a storage node as corresponding to the obtained input-output request based at least in part on the obtained input-output request;
   to retrieve information including an indication of a separate portion of the compute node than a portion of the compute node from which the input-output request is obtained;
   to associate the information with the input-output request; and
   to submit the input-output request and the associated information to a target node for delivery by the target node to the storage node via the at least one network, wherein the storage node is configured to submit a response to the input-output request to the compute node via the at least one network using the separate portion of the compute node instead of the portion of the compute node from which the input-output request is obtained, based at least in part on the information, wherein the response submitted by the storage node to the compute node bypasses the target node;
   wherein the information is provided separately from the input-output request; and
   wherein the compute node is configured to receive the response to the input-output request on the separate portion of the compute node.

2. The apparatus of claim 1 wherein the storage node being configured to submit the response to the input-output request to the compute node via the at least one network based at least in part on the information comprises the storage node being configured to submit the response to the input-output request to the compute node using the portion of the compute node as if the storage node was the target node based at least in part on the information.

3. The apparatus of claim 1 wherein associating the information with the input-output request comprises appending the information to the input-output request.

4. The apparatus of claim 1 wherein:
associating the information with the input-output request comprises generating a message comprising the input-output request and the associated information; and
submitting the input-output request and the associated information to the storage node comprises submitting the generated message to the storage node.

5. The apparatus of claim 1 wherein:
the at least one network comprises a first communication pathway between the compute node and the apparatus;
the at least one network comprises a second communication pathway between the apparatus and the storage node;
the at least one network comprises a third communication pathway between the storage node and the compute node;
the compute node is configured to submit the input-output request to the apparatus via the first communication pathway;
the at least one processing device is configured to submit the input-output request to the storage node via the second communication pathway; and
the storage node is configured to submit the response to the compute node via the third communication pathway.

6. The apparatus of claim 5 wherein the at least one processing device is further configured to obtain a notification from the storage node that comprises an indication that the response has been submitted to the compute node via the third communication pathway.

7. A method comprising:
obtaining an input-output request issued by an application executing on a compute node via at least one network;
identifying a storage node as corresponding to the obtained input-output request based at least in part on the obtained input-output request;
retrieving information including an indication of a separate portion of the compute node than a portion of the compute node from which the input-output request is obtained;
associating the information with the input-output request; and
submitting the input-output request and the associated information to a target node for delivery by the target node to the storage node via the at least one network, wherein the storage node is configured to submit a response to the input-output request to the compute node via the at least one network using the separate portion of the compute node instead of the portion of the compute node from which the input-output request is obtained, based at least in part on the information, wherein the response submitted by the storage node to the compute node bypasses the target node;
wherein the information is provided separately from the input-output request;
wherein the compute node is configured to receive the response to the input-output request on the separate portion of the compute node; and
wherein the method is implemented by at least one processing device of an apparatus, the at least one processing device comprising a processor coupled to memory.

8. The method of claim 7 wherein the portion of the compute node from which the target node obtains the input-output request and the associated information from the compute node comprises a first port of the compute node, and wherein the separate portion of the compute node on which the compute node receives the response to the input-output request comprises a second port of the compute node different than the first port of the compute node.

9. The method of claim 7 wherein
the storage node being configured to submit the response to the input-output request to the compute node via the at least one network based at least in part on the information comprises the storage node being configured to submit the response to the input-output request to the compute node using the portion of the compute node as if the storage node was the target node based at least in part on the information.

10. The method of claim 7 wherein:
associating the information with the input-output request comprises generating a message comprising the input-output request and the associated information; and
submitting the input-output request and the associated information to the storage node comprises submitting the generated message to the storage node.

11. The method of claim 7 wherein:
the at least one network comprises a first communication pathway between the compute node and the apparatus;
the at least one network comprises a second communication pathway between the apparatus and the storage node;
the at least one network comprises a third communication pathway between the storage node and the compute node;
the compute node is configured to submit the input-output request to the apparatus via the first communication pathway;
the at least one processing device is configured to submit the input-output request to the storage node via the second communication pathway; and
the storage node is configured to submit the response to the compute node via the third communication pathway.

12. The method of claim 11 wherein the at least one processing device is further configured to obtain a notification from the storage node that comprises an indication that the response has been submitted to the compute node via the third communication pathway.

13. A computer program product comprising a non-transitory processor-readable storage medium having stored therein program code of one or more software programs, wherein the program code when executed by at least one processing device of an apparatus, causes the at least one processing device to perform the method of claim 7.

14. The apparatus of claim 1 wherein the portion of the compute node from which the target node obtains the input-output request and the associated information from the compute node comprises a first port of the compute node, and wherein the separate portion of the compute node on which the compute node receives the response to the input-output request comprises a second port of the compute node different than the first port of the compute node.

15. An apparatus comprising:
a storage node comprising at least one processing device comprising a processor coupled to memory and a plurality of storage devices, the storage node being configured:
to obtain, from a target node via at least one network, an input-output request associated with an application executing on a compute node and information including an indication of a separate portion of the compute node than a portion of the compute node from which the input-output request is obtained by the target node, the target node being configured to identify the storage node as corresponding to the input-output request based at least in part on the input-output request; and to submit a response to the input-output request to the compute node via the at least one network using the separate portion of the compute node instead of the portion of the compute node from which the input-output request is obtained, based at least in part on the information that was obtained from the target node, wherein the response submitted by the storage node to the compute node bypasses the target node;

wherein the information is provided separately from the input-output request; and wherein the compute node is configured to receive the response to the input-output request on the separate portion of the compute node.

16. The apparatus of claim 15 wherein submitting the response to the input-output request to the compute node via the at least one network based at least in part on the information comprises submitting the response to the input-output request to the compute node using the portion of the compute node as if the storage node was the target node based at least in part on the information.

17. The apparatus of claim 15 wherein:

the information is appended to the input-output request by the target node; and obtaining the information comprises obtaining the information from the input-output request.

18. The apparatus of claim 15 wherein:

the at least one network comprises a first communication pathway between the compute node and the target node;

the at least one network comprises a second communication pathway between the target node and the storage node;

the at least one network comprises a third communication pathway between the storage node and the compute node;

the compute node is configured to submit the input-output request to the target node via the first communication pathway;

the target node is configured to submit the input-output request to the storage node via the second communication pathway; and the storage node is configured to submit the response to the compute node via the third communication pathway.

19. The apparatus of claim 18 wherein the at least one processing device is further configured to submit a notification to the target node that comprises an indication that the response has been submitted to the compute node via the third communication pathway.

20. The apparatus of claim 15 wherein the portion of the compute node from which the target node obtains the input-output request and the information from the compute node comprises a first port of the compute node, and wherein the separate portion of the compute node on which the compute node receives the response to the input-output request comprises a second port of the compute node different than the first port of the compute node.

* * * * *